UNITED STATES PATENT OFFICE.

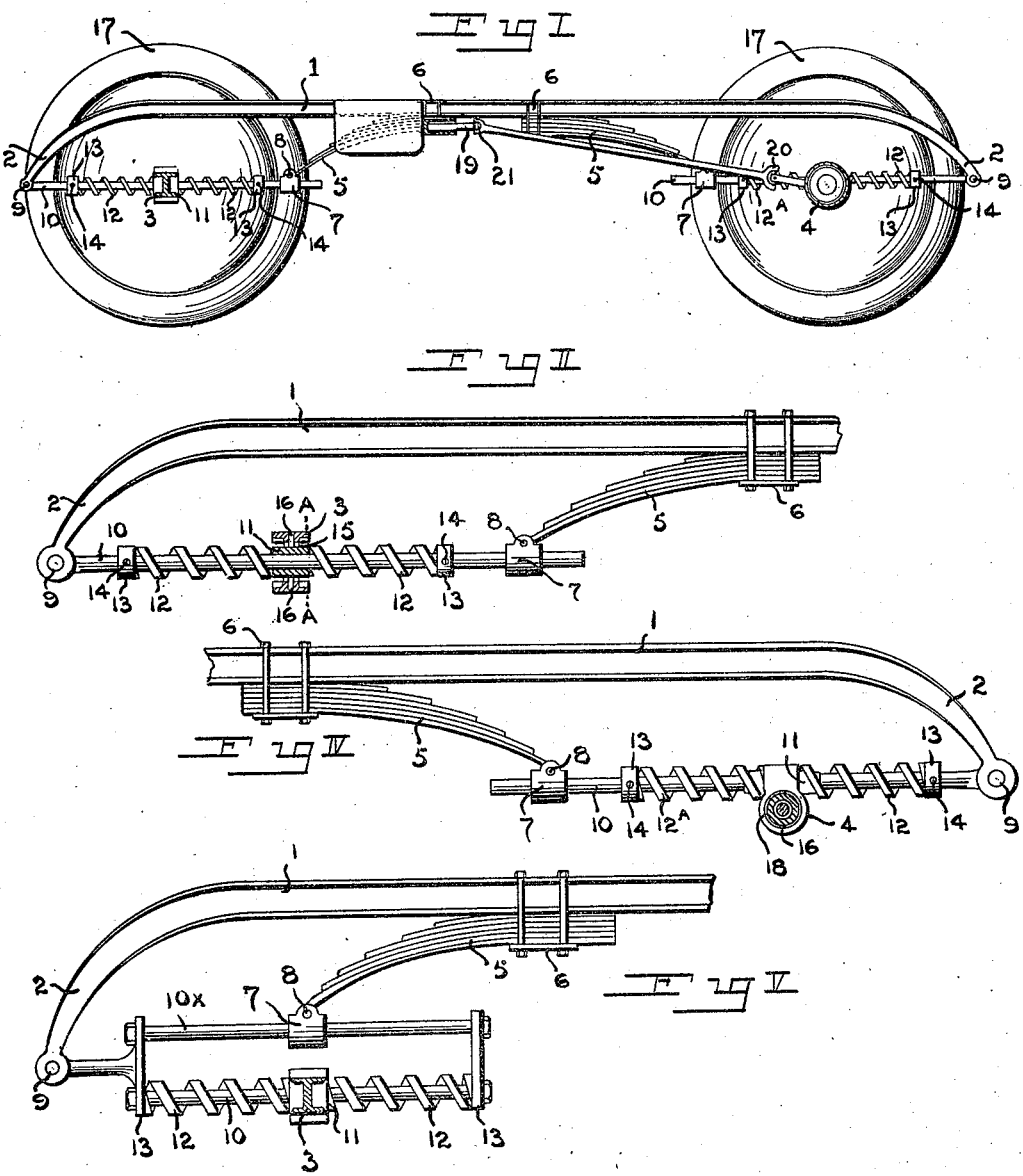
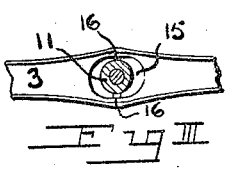

LINDSAY CLAUDE NAESER, OF JOHANNESBURG, TRANSVAAL, SOUTH AFRICA.

VEHICLE SPRINGING.

1,414,147.   Specification of Letters Patent.   Patented Apr. 25, 1922.

Application filed April 30, 1920. Serial No. 377,999.

*To all whom it may concern:*

Be it known that I, LINDSAY C. NAESER, a subject of the King of England, residing at Johannesburg, Transvaal Province, Union of South Africa, have invented certain new and useful Improvements in Vehicle Springing, of which the following is a specification.

The present invention relates to the springing of vehicles and especially motor vehicles.

The invention is illustrated in the accompanying drawings, in which—

Fig. I shows a car chassis constructed according to the invention and sectioned vertically.

Fig. II is an enlarged view of the front portion thereof differently sectioned.

Fig. III is a section on A—A Fig. II.

Fig. VI is an enlarged view of the rear part of the chassis of Fig. I.

Fig. V shows a modified construction.

According to the present invention the connection between the axles and the chassis is such that besides having relative up and down movement, said parts can also move relatively fore and aft. The whole relative moment is spring controlled; the effect being that when a wheel strikes an obstacle in the road, it can move both backwardly and upwardly relatively to the chassis and thus minimize the shock transmitted to the latter.

Referring to the drawings, 1 indicates the chassis frame formed at each end with dumb-irons 2. 3 is the front axle, and 4 the rear axle.

Referring more particularly to Figs. I to III, 5 indicates a quarter elliptical leaf spring which is clamped to the chassis frame at 6. At the free end of said spring 5 is a bearing block 7 secured to the spring 5 by a horizontal pivot 8. Pivotally attached to the dumb-iron 2 at 9 is a guide rod 10 which passes through said bearing block 7, so as to be free for relative sliding and rotating movement therewith. 11 is a slipper which slides freely on the guide rod 10, subject to the control of coil springs 12, which are compressed between said slipper 11 and abutments 13. Said abutments 13 are adjustably clamped on the guide bar 10, to regulate the tension of the springs 12, by set screws 14 or the like.

The axle 3 is formed towards each end with an aperture 15 to pass over the adjacent slipper 11, and said slippers 10 are connected to the axle by vertical pivot joints 16.

It will be seen that with the arrangement described the axle 3 has a definite fore and aft movement under the control of the springs 12, as well as an up and down movement which is permitted by the guide bar 10 pivoting about the point 9 under the control of the spring 5. The spring 5 prevents longitudinal movement of the axle, but otherwise the latter has universal movement. The result is that when either wheel 17 strikes an obstacle on the road, it can move backwards relatively to the chassis without imparting a shock to the latter. It passes over the obstacle by deforming the spring 5 in the usual manner, and the axle thereupon resumes its normal position under the influence of the springs 12 and 5. Owing to the capacity for relative rotation between the bar 10 and the bearing block 7, lifting of the axle 3 at one end only does not twist the spring 5, as occurs with the present spinging systems, and the life of said spring is thereby prolonged. Moreover, in the arrangement shewn, the chassis frame 1 is efficiently supported, that is, at the points 9 and the intermediate points 6, instead of, as usual, at the end points only. The pivotal joint 16 permits canting of the axle in a horizontal plane as when one wheel on the axle moves horizontally to a different degree from the other wheel.

The rear axle construction shown in Figs. I and IV is substantially the same as that described in connection with the front axle, except that owing to the size of the rear axle casing 4, and the fact that as ordinarily constructed it does not admit of being apertured, it is preferred to position the axle under the slippers 11, for which purpose said slippers are each formed with apertures 18, in which the axle is mounted by a vertical pivot 16.

In the case of the rear axle construction, the drive from the wheels is transmitted through the springs 12, and the forward spring, marked $12^a$, is consequently made somewhat heavy. The fact of driving through the spring $11^a$ is of great advantage in avoiding shocks in the transmission structure, and ensuring easy starting without jerking the car.

The transmission system is suitably modified to permit the relative movement, both as a whole and angularly of the axle with regard to the chassis. For this purpose as shown in Fig. I, the transmission is provided with a sliding joint 19, and an additional universal joint 20, as well as the regular universal joint 21.

The construction permits a very much greater spring movement to be attained than is feasible with the usual leaf spring and shackle construction. It also has the advantage that either axle can be readily removed from the chassis by disconnecting the joints 9 when the guide rods 10, together with the attached axle and springs 12, can be withdrawn bodily from the bearing blocks 7.

The construction shown in Fig. V is designed to bring the seating point of the spring 5 substantially over the axle. For this purpose an additional guide rod $10^x$ is provided, rigid and parallel with the guide rod 10, and the bearing block 7 is arranged about centrally of said additional guide rod $10^x$.

I claim:—

1. A spring suspension construction for vehicles comprising a chassis frame, an axle, substantially horizontal guide bars on said chassis frame, slippers connected to the axle and movable along said guide bars, said guide bars being pivotally connected to the chassis frame at one end, springs connected at an intermediate point of the chassis frame and carrying bearing blocks, the guide bars sliding through said bearing blocks and being free for rotation relatively thereto.

2. A spring suspension construction for which vehicles comprising a chassis frame, an axle, substantially horizontal guide bars pivotally connected direct to the ends of the chassis frame, springs each of which is connected at one end to an intermediate point on the chassis frame and at the other end to a bearing block carried on one of said guide bars, said bearing block being free to slide and rotate relatively to the guide bar, the axle being attached to the guide bars by means of spring controlled slippers.

3. A spring suspension construction for vehicles comprising a chassis frame, an axle, substantially horizontal guide bars pivotally connected direct to the ends of the chassis frame, springs each of which is connected at one end to an intermediate point on the chassis frame and at the other end to a bearing block carried on one of said side bars, said bearing block being free to slide and rotate relatively to the guide bar, spring controlled slippers slidably mounted on the guide bars and vertical pivot means connecting the axle to the slippers.

4. A spring suspension construction for vehicles comprising a chassis frame, an axle, substantially horizontal guide bar members pivotally connected direct to the ends of the chassis frame, each member consisting of two parallel bars rigidly connected together, springs each of which is connected at one end to an intermediate point on the chassis frame and at the other end to a bearing block carried on one of said parallel bars, said bearing block being free to slide and rotate relatively to the guide bar, the axle being attached to the other guide bars constituting the guide bar members by means of spring controlled slippers.

5. A spring suspension construction for vehicles comprising a chassis frame, a driving axle, substantially horizontal guide bars on said chassis frame, slippers connected to the axle and movable along said guide bars, said guide bars being pivotally connected to the chassis frame at one end, springs connected at an intermediate point of the chassis frame and carrying bearing blocks, the guide bars sliding through said bearing blocks and being free for rotation relatively thereto and axle driving means embodying two universal joints and a sliding joint.

In testimony whereof I affix my signature.

LINDSAY CLAUDE NAESER.